United States Patent Office 3,467,225
Patented Sept. 16, 1969

3,467,225
HYDRODYNAMIC BRAKE WITH AXIALLY SHIFTABLE STATOR
Hermann Steffen, Neu-Isenburg, Rodney Jones, Frankfurt am Main, and Horst Nellen, Niederroden, Germany, assignors to Alfred Teves G.m.b.H., Frankfurt am Main, Germany, a corporation of Germany
Filed Jan. 12, 1968, Ser. No. 697,397
Claims priority, application Germany, Jan. 18, 1967, T 33,009
Int. Cl. F16d 57/00
U.S. Cl. 188—90                                           12 Claims

ABSTRACT OF THE DISCLOSURE

A hydrodynamic brake having an axially shiftable annular stator movable by a hydraulic cylinder toward and away from the rotor to increase or decrease the pumping efficiency and provided with inner and outer seals engaging corresponding portions of the surrounding housing to prevent passage of the hydrodynamic brake fluid therepast.

---

Figure 1:
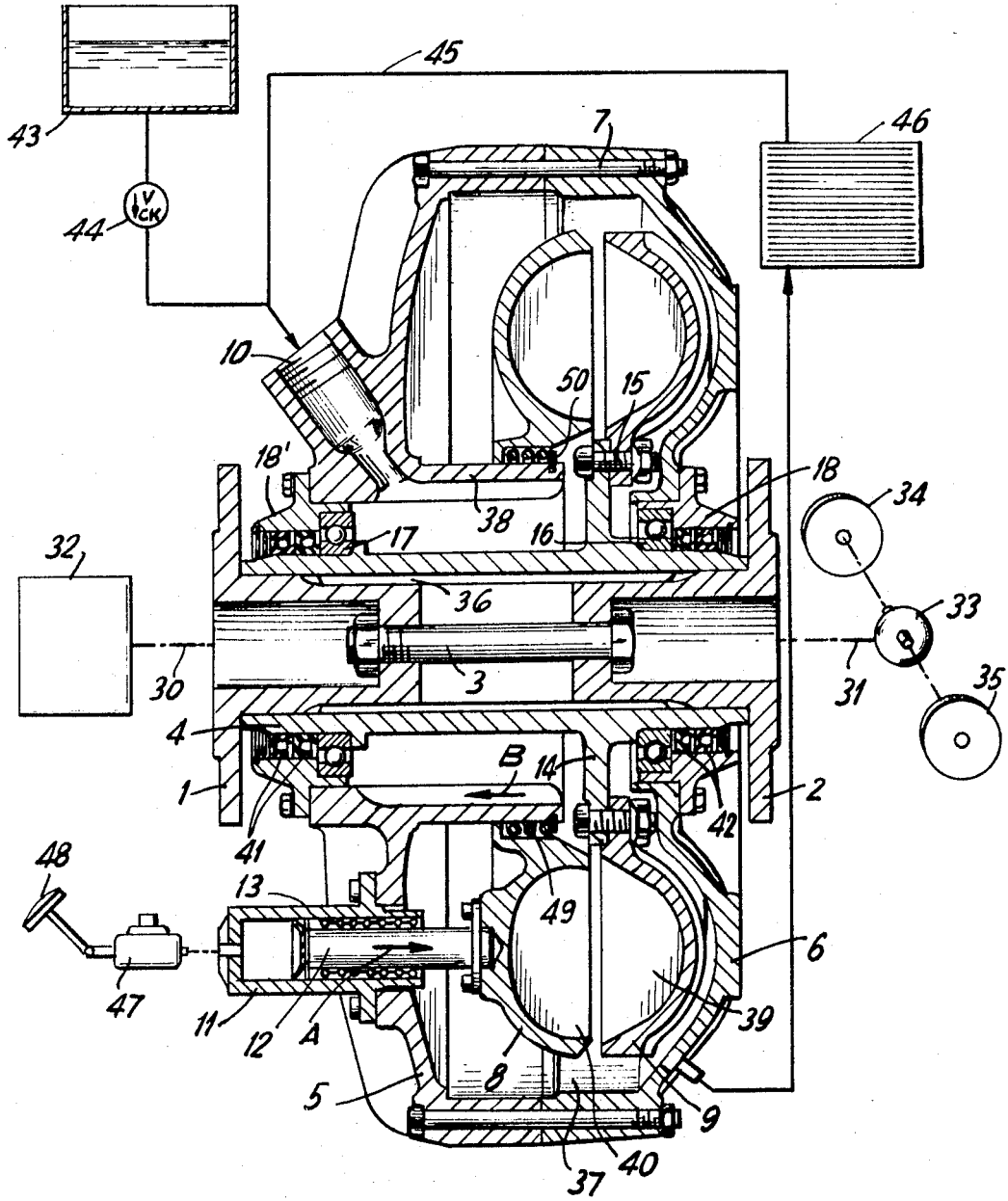

Our present invention relates to a hydrodynamic brake system, which may be used in conjunction with the hydraulic wheel brakes of heavy-duty automotive vehicles, whereby the kinetic braking energy is converted into heat, raising the temperature of a hydrodynamic-brake fluid.

It has already been proposed to provide hydrodynamic brake or decelerator systems for restricting rotation of the shaft (e.g. the drive shaft) of an automotive vehicle) relative to a stationary decelerator member. For the most part, drive shafts of this character are connected in the power train connected with driven wheels of the vehicle, generally through a differential. To permit relative vertical movement of the driven wheels and the vehicle body, the power shaft is provided at its ends with so-called "universal" joints or couplings (which can also be designated as cardan joints), the power shaft being known as a "cardan shaft." In such hydrodynamic decelerators, the systems generally comprises a rotor in the form of a half shell connected with the shaft to be braked and a complementary shell half forming the stator and mounted upon a support (e.g. the vehicle chassis). The shells define between them an annular chamber which can be constituted from a multiplicity of segmental compartments whose vanes circulate a hydraulic fluid by pumping action through a heat exchanger in which the heat generated by the pumping action is dissipated. When hydraulic fluid is supplied to this decelerator, friction is created by the pumping action to produce heat in dependence upon the degree of impediment by the fluid to rotation of the shaft, this heat being referred to hereinafter as "kinetic braking heat." The heat may be dissipated by a heat exchanger which may be the decelerator housing, an air-cooled separate heat exchanger or, as described and claimed in commonly assigned copending application Ser. No. 672,121 filed Oct. 3, 1967 and entitled "Hydrodynamic Brake System for Motor Vehicles," is to dissipate the thermal braking energy by indirect liquid-heat transfer into the cooling system of a water-cooled automotive engine.

Such systems find their most practical utility in heavy-duty automotive vehicles (such as track and chain-driven vehicles, front-end loaders, towing tractors, back hoes and the like) and with heavily laden trucks and semitrailers which are difficult to slow solely with friction brakes, especially in downhill travel. In the aforedescribed systems, a hydraulic decelerator is used to provide liquid-friction braking at the most effective point, i.e. at relatively high vehicle speeds with the final brake action resulting from conventional mechanical-friction wheel braking. Brakes of the latter types are most effective after the vehicle has initially been slowed. Systems of this character are described in the commonly assigned Patents No. 3,265,162 issued Aug. 9, 1966, and No. 3,302,655 issued Feb. 7, 1967, as well as in the commonly assigned copending application Ser. No. 669,941 filed Sept. 22, 1967, entitled "Brake System."

In the prior patents and application mentioned above, the vehicle-brake system includes a hydraulic decelerator coupled with the shaft whose rotor cooperates with a stationary stator connected with the vehicle shaft for reducing the rotor speed upon the supply of hydraulic fluid under pressure to the decelerator. This system, as far as is goes, is incapable of bringing the shaft to standstill. Thus, the patentees provide a fluid-responsive mechanical-friction brake in the decelerator housing, the brake being hydraulically actuable for frictionally interconnecting the relatively rotatable decelerator members. For the purposes of the aforedescribed patented systems and for the purposes of the present application as far as the decelerator structure is concerned, reference may be made to U.S. Patents No. 1,297,225 and No. 2,241,189 which illustrate and describe rotor and stator constructions which are also applicable here.

In the application Ser. No. 669,941 mentioned earlier, it has been pointed out that prior-art hydrodynamic brakes had a significant disadvantage in that even when the decelerator was not actuated by fluid pressurization, some pumping action continued and gave rise to fluid loss, mechanical breakdown of the liquid and some power loss. Accordingly, that application provides for the de-energization of the hydrodynamic brake by applying a reduced pressure to a charging cylinder or, conversely, to the charging of the hydrodynamic brake by gas pressurization of this cylinder.

In this application and the commonly assigned copending application Ser. No. 668,462 of Sept. 18, 1967, the relationship between the hydrodynamic-braking effectiveness and the wheel-braking effectiveness is described. Thus, in those systems, a feedback arrangement is provided between the hydraulic decelerator and the control means, namely, a brake master cylinder, to ensure that the brake force applied to the shaft and the wheels remains constant. It will be understood that the hydrodynamic brake is effective to decelerate the rear wheels in the vehicle, these wheels being normally powered through the cardan shaft. Since the rear-wheel brakes operate as well upon these wheels, it is advantageous to balance the hydrodynamic braking effectiveness and the friction-braking effectiveness to maintain, upon application of a given pressure to the brake pedal, a constant total brake force. The feedback means there described comprises a servo mechanism which is connected by a hydraulic line to deliver a control pulse to a servo valve connected between the master cylinder and the rear-wheel brake cylinder.

In addition, it is possible to control the effectiveness of the pumping action by withdrawing the veins from the pumping path, thereby simultaneously avoiding problems which have been encountered in connection with a limited pumping action in the de-energized state of the hydrodynamic brake. For the most part, however, this problem could be solved heretofore only by the techniques previously described. It is, therefore, the principal object of the present invention to provide an improved hydrodynamic brake system of simplified construction which limits undesired pumping action.

A more specific object of our invention is the provision of a hydrodynamic brake which permits simplified control of braking effectiveness and pump operation.

Another object of this invention is to provide an improved hydrodynamic brake with a minimum number of moving parts and a control system of similar simplicity.

We have now found that pumping action in a hydrodynamic brake can be effectively controlled by mounting the starter element of the brake in its housing member so as to be axially shiftable relatively to the rotor element under the control of hydraulic means such as a piston-and-cylinder arrangement. Thus, in general terms, the present invention involves a hydrodynamic brake housing whose member forms a pumping chamber adapted to be mounted on a nonrotatable portion of the vehicle, e.g. the vehicle chassis, and receives a nonrotatable annular stator element in the form of an axially open semitoroid which confronts a similarly shaped annular rotor element whose shaft member is connected in the power train of the vehicle, e.g. by connection to the cardan shaft between the engine and the wheel-driving differentential. One of these elements is mounted so as to be axially shiftable to its associated member by a piston-and-cylinder arrangement connecting the shiftable element and its member as described in greater detail hereinafter. Preferentially, as has been noted above, the axially shiftable element is the stator which is sealed relatively to the housing member by an annular seal means in the form of a pair of sealing rings.

Figure 2:
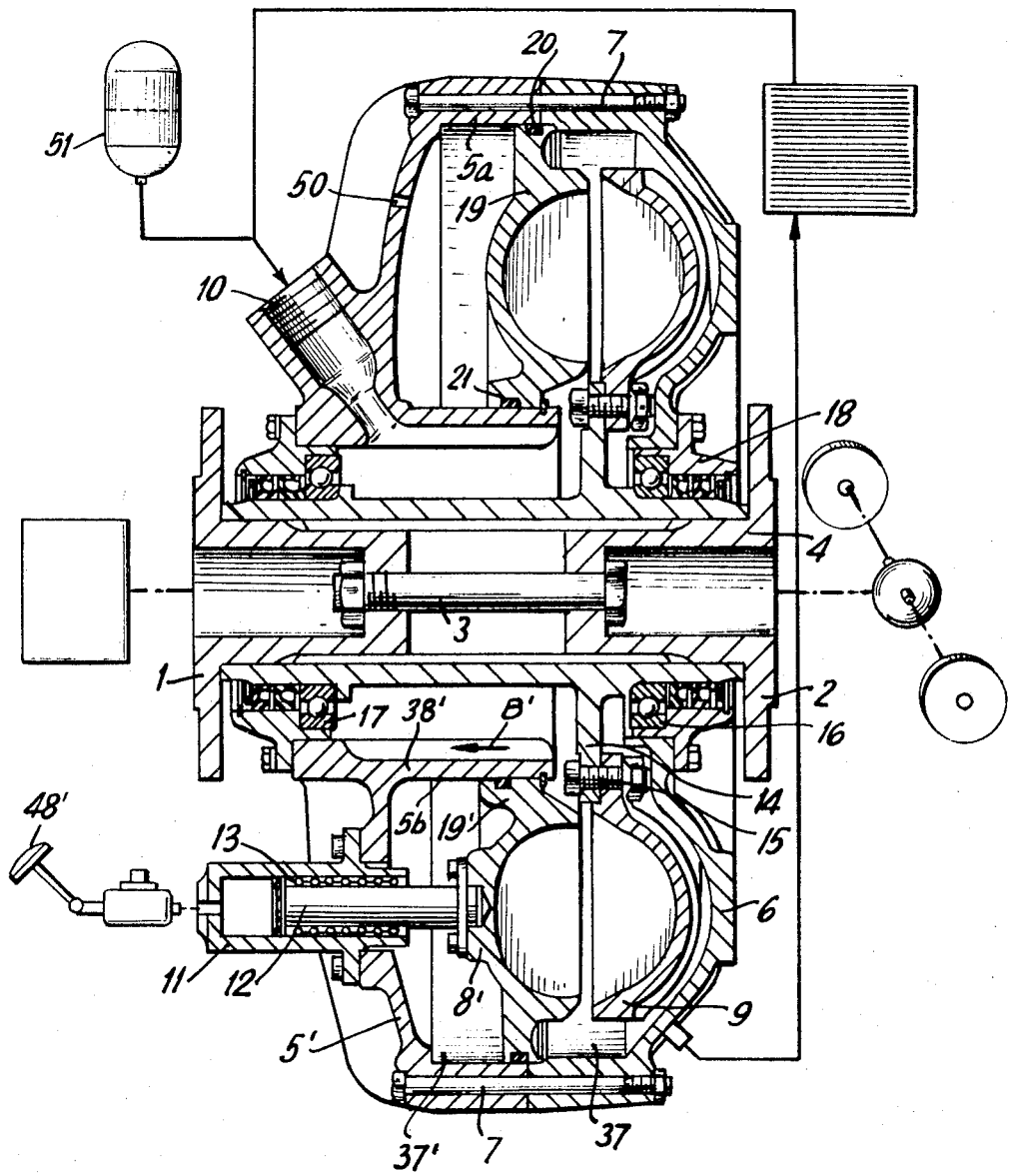

The above and other objects, features and advantages of the present invention will become more readily apparent from the following description, reference being made to the accompanying drawing in which:

FIG. 1 is an axial cross-sectional view through a hydrodynamic brake embodying the present invention, showing the associated parts in diagrammatic form; and FIG. 2 is a similar cross-sectional view through another embodiment of this invention.

In FIG. 1, we show a hydrodynamic brake whose shaft member comprises a pair of flanged studs 1 and 2 which are axially interconnected by a bolt 3 and are joined in the power train of the vehicle, e.g. in the cardan shaft represented at 30 and 31 in dot-dash lines. The power train is provided between the engine 32 and a differential 33 by means of which the torque of the power train is applied to the vehicle wheels 34 and 35 in the manner described in any of the aforementioned copending applications. The flanged studs 1 and 2 are keyed via a spline formation 36 to a rotor element whose hub 4 is a spacer sleeve connected to a toroidal shell 9 via a flange 19 and the bolts 15. The housing member of this hydrodynamic brake is represented at 5 and is completed by a cover 6 joined thereto by angular equispaced axially extending tension bolts 7 and is also attached to the housing with at most limited angular play (see the aforementioned copending applications) in the usual manner. The housing 5–7 defines a pumping chamber 37 and is formed with an inner tubular sleeve portion 38 spacedly surrounding the rotor sleeve 4 and the shaft 1–3. The sleeve portion 38 carries the axially shiftable stator element 8 which forms an axially open semitoroidal shell facing the rotor shell 9. The vanes of the rotor and stator are represented at 39 and 40 but may have the configuration described in any of the above-identified patents. The rotor 4, 9, 14 is journaled in the housing member 5–7 by a pair of bearings 16 and 17, conventional seals 41 and 42 preventing the escape of fluid from chamber 37. The flanged bushings 18 and 18' at the opposite axial ends of the sleeve 4 limit axial movement of the rotor element relatively to the housing member 5–7.

The hydraulic fluid is supplied via a fitting 10 to the chamber 37 from a reservoir 43 and a check valve 44 and the closed fluid-circulating path is represented at 45 and includes a heat-exchanger 46 for dissipating the thermal energy of the fluid. Upon rotation of shaft 1, 2 in the pumping condition of the hydrodynamic brake, the hydrodynamic fluid is drawn from the region of the axis of the rotor and pump by the vanes 39, 40 to transform energy of rotation into heat energy, thereby raising the temperature of the fluid which is pumped to the radiator 46 where the heat is dissipated before the fluid is returned to the pump. The closed path 45 and radiator 46 may be dispensed with and the heat dissipated solely through the housing walls 5, 6 if desired.

For regulation of the pumping action, the stator is provided with control means in the form of a hydraulic cylinder 11 which may be supplied with fluid from a brake master cylinder 47 operated by the brake pedal 48 of the vehicle. The piston 12 of this cylinder is axially slidable therein and co-operate with a ball-bearing sleeve 13 which ensures proper centering of the piston 12 during its axial movement. The stator 8 is biased in the opposite direction (arrow B) by a spring 49 which rests against a split ring 50 preventing excessive axial movement of the stator 8 in the direction of arrow A.

In the system of FIG. 1, the brake fluid is initially supplied to the chamber 37 (additional quantities being automatically drawn in as required from the reservoir 43) and the hydrodynamic brake effectiveness is controlled sloely by the axial movement of the stator 8 toward the rotor 9 (arrow A) or away therefrom (arrow B). In the left-hand extreme position of the stator 8, the vortex and turbulence effect of the pumping action is minimal and substantially the only losses during this idling condition of the hydrodynamic brake are those of the bearing and seal ring friction. To produce braking action, the brake pedal 48 is actuated to drive fluid into the cylinder 11 and shift the stator 8 (arrow A) toward the rotor 9, thereby inducing an increased fluid coupling between the stator and rotor and promoting braking operations. The axial movement of the stator 8 can be produced as indicated by hydraulic automatic means or even by mechanical means, e.g. by a bowden cable acting upon the piston 12 upon removal of the cylinder 11.

In the embodiment shown in FIG. 2, which is generally similar to that of FIG. 1 except that the stator 8' is formed with an outer peripheral flange 19' having a seal 21. The seals 20 and 21 respectively engage an axially extending outer portion 5a of the housing 5' and an axially extending inner portion 5b formed by the sleeve 38' as described earlier. The space 37' behind the rotor 8' is vented to the atmosphere via a bolt 50 to permit the piston-and-cylinder arrangement 11, 12 to axially shift the stator 8. Chamber 37 in this embodiment is hermetically sealed and can be connected to a closed gas/liquid accumulator 51 via a fitting 10 so that, when the stator 8' is shifted in the direction of arrow B', a negative or subatmospheric pressure can be generated in chamber 37 (assuming depletion of liquid from accumulator 51) and the pumping losses within the chamber 37 during idling further reduced in accordance with the principles of the above-identified copending applications. In both embodiments, however, it is possible to control the braking effectiveness in a simple manner by the brake pedal 48 or 48'. An increased response rate for operation and inactivation of the brake is also gained.

We claim:
1. A hydrodynamic brake comprising:
   a housing member forming an annular pumping chamber adapted to receive a hydrodynamic-brake fluid;
   an annular, inwardly extending sleeve on said housing member;
   a nonrotatable annular, vaned stator element mounted axially shiftably on said sleeve in said housing member, said stator element being concave in one axial direction;
   a vaned rotatable rotor element received in said housing member and juxtaposed with said stator element while being concave in the opposite direction to confront said stator element and define therewith an annular pumping compartment and effect pump- ing of said hydrodynamic-brake fluid upon rotation of said rotor element to brake rotation thereof, said housing member being formed with an inlet communicating with the interior of said sleeve and an outlet adapted to communicate with said compartment for circulation of said fluid from said outlet to said inlet;

a shaft member journaled for rotation relatively to said housing member and associated with said rotor element for rotation jointly therewith;

heat-exchanger means connected across said inlet and said outlet for dissipating heat in the fluid circulated therebetween;

and control means for at least partially regulating the pumping of said hydrodynamic brake fluid, said control means including means for selectively axially shifting one of said vaned elements relatively to the other of said elements, and bodily bringing said elements toward one another and spreading them apart to increase the pumping action in a relatively proximal condition of said elements and to decease the pumping action in a relatively distal condition of said elements.

2. A hydrodynamic brake as defined in claim 1, further comprising annular seal means between said one of said elements and its associated member preventing passage of said fluid therepast.

3. A hydrodynamic brake as defined in claim 2 wherein said control means includes a piston-and-cylinder arrangement chargeable with hydraulic fluid and connected between said one of said elements and its associated member.

4. A hydrodynamic brake as defined in claim 3 wherein said one of said elements is said stator element.

5. A hydrodynamic brake as defined in claim 1 wherein said one of said elements is said stator element and its associated member is said housing member.

6. A hydrodynamic brake as defined in claim 5, further comprising annular seal means between said stator element and said housing member preventing the passage of said fluid therepast.

7. A hydrodynamic brake as defined in claim 5 wherein said control includes a piston-and-cylinder arrangement operable by hydraulic pressure and connected between said stator element and said housing member.

8. A hydrodynamic brake as defined in claim 7 wherein said piston-and-cylinder arrangement includes a hydraulic cylinder formed in said housing member and a piston fixed to said stator element and slidably received in said cylinder.

9. A hydrodynamic brake as defined in claim 7 wherein said piston-and-cylinder arrangement is offset outwardly from said shaft member.

10. A hydrodynamic brake comprising:
an annular housing;
a shaft journaled in said housing, said housing defining an annular pumping chamber around said shaft;
a rotor ring of semitoroidal configuration secured to said shaft along the inner periphery of said ring and concave in one axial direction, said housing having an inwardly extending sleeve coaxial with said shaft;
an axially shiftable semitoroidal stator ring mounted on said sleeve and nonrotatable with respect to said housing while being concave in the opposite axial direction and confronting said rotor ring to define therewith an annular pumping compartment communicating with the interior of said sleeve;
inlet means on said housing communicating with the interior of said sleeve and outlet means on said housing outwardly of said rings for sustaining circulation of a hydrodynamic-brake fluid upon pumping thereof by rotation of said rotor ring relative to said stator ring;
seal means between said shaft and said housing for preventing the escape of said fluid from said chamber;
heat-exchanger means connected across said inlet means and said outlet means for dissipating heat from said fluid upon the circulation thereof from said outlet means to said inlet means by rotation of said rotor ring; and
at least one hydraulic cylinder mounted on said housing and opening axially in the direction of said stator ring, and a piston received in said cylinder and engaging said stator ring for axially displacing same relatively to said rotor ring to increase the pumping action of said rings in a relatively proximal condition of said rings and for decreasing the pumping action in a relatively distal condition of said rings.

11. A hydrodynamic-brake as defined in claim 10, further comprising spring means surrounding said sleeve and seated axially thereagainst while bearing upon said stator ring for urging same in said one direction.

12. A hydrodynamic brake as defined in claim 10, further comprising first annular sealing means between the inner periphery of said stator rings and said sleeve, and second annular sealing means between the outer periphery of said stator ring and said housing for sealing said compartment whereby pressure built up therein biases said stator ring in said one direction.

References Cited

UNITED STATES PATENTS

| | | | |
|---|---|---|---|
| 2,195,712 | 1/1938 | Welch et al. | 188—90 |
| 2,359,930 | 10/1944 | Miller | 60—54 |
| 2,633,697 | 4/1953 | Johnson. | |
| 3,330,386 | 7/1967 | Bertram et al. | |

GEORGE E. A. HALVOSA, Primary Examiner